United States Patent
Zhang

(10) Patent No.: US 10,613,480 B2
(45) Date of Patent: Apr. 7, 2020

(54) HOLOGRAPHIC DISPLAY DEVICE INCLUDING SPATIAL LIGHT MODULATOR AND LIGHT DIRECTING UNIT CONVERGING OUTPUT LIGHT OF THE SPATIAL LIGHT MODULATOR, AND METHOD FOR CONTROLLING THE SAME

(71) Applicant: BOE TECHNOLOGY GROUP CO., LTD., Beijing (CN)

(72) Inventor: Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 148 days.

(21) Appl. No.: 15/751,533

(22) PCT Filed: Jun. 14, 2017

(86) PCT No.: PCT/CN2017/088236
§ 371 (c)(1),
(2) Date: Feb. 9, 2018

(87) PCT Pub. No.: WO2018/072461
PCT Pub. Date: Apr. 26, 2018

(65) Prior Publication Data
US 2019/0011884 A1  Jan. 10, 2019

(30) Foreign Application Priority Data
Oct. 20, 2016  (CN) .......................... 2016 1 0916464

(51) Int. Cl.
*G03H 1/08* (2006.01)
*G03H 1/22* (2006.01)
*G02B 27/22* (2018.01)

(52) U.S. Cl.
CPC ....... *G03H 1/2294* (2013.01); *G02B 27/2214* (2013.01); *G03H 1/2202* (2013.01);
(Continued)

(58) Field of Classification Search
CPC .......... G02B 5/32; G03H 1/00; G03H 1/0005; G03H 1/02; G03H 2001/0208;
(Continued)

(56) References Cited

U.S. PATENT DOCUMENTS

| 5,864,326 A | 1/1999 | Rallison |
| 8,294,966 B2 | 10/2012 | Kroll et al. |

(Continued)

FOREIGN PATENT DOCUMENTS

| CN | 2511994 Y | 9/2002 |
| CN | 101681147 A | 3/2010 |

(Continued)

OTHER PUBLICATIONS

First Office Action, including Search Report, for Chinese Patent Application No. 201610916464.6, dated Mar. 5, 2019, 12 pages.

(Continued)

*Primary Examiner* — Arnel C Lavarias
(74) *Attorney, Agent, or Firm* — Westman, Champlin & Koehler, P.A.

(57) ABSTRACT

A holographic display device and a method for controlling the same are disclosed. The holographic display device includes a light source, a spatial light modulator, an adjustable light directing device and a direction controller. The modulator is arranged at a light exit side of the light source and modulates a reading light and to emit an output light; the controller for setting an optical path of the output light depending on an observation position and outputting a control signal to the light directing device depending on the optical path is connected to the light directing device, the optical path being matched with the observation position; the light directing device is arranged on an light exit side of the modulator and adjusts a direction of the output light of the modulator in response to the control signal to direct the (Continued)

output light to the observation position along the optical path.

16 Claims, 8 Drawing Sheets

(52) U.S. Cl.
CPC ..... *G03H 1/2205* (2013.01); *G03H 2001/221* (2013.01); *G03H 2001/2207* (2013.01); *G03H 2001/2242* (2013.01); *G03H 2210/30* (2013.01); *G03H 2223/12* (2013.01); *G03H 2223/24* (2013.01); *G03H 2226/05* (2013.01); *G03H 2227/03* (2013.01)

(58) Field of Classification Search
CPC ... G03H 2001/0216; G03H 2001/0228; G03H 1/08; G03H 1/0866; G03H 1/16; G03H 1/22; G03H 2001/2223; G03H 2001/2234; G03H 2001/2236; G03H 2001/2239; G03H 2001/2242; G03H 1/26; G03H 2226/00; G03H 2226/05
USPC ...... 359/1, 9, 13, 14, 15, 19, 22, 29, 32, 33, 359/35; 353/28, 30, 39
See application file for complete search history.

(56) References Cited

U.S. PATENT DOCUMENTS

| | | | |
|---|---|---|---|
| 8,462,409 B2 * | 6/2013 | Olaya | G02B 27/0093 348/40 |
| 9,116,505 B2 * | 8/2015 | Schwerdtner | G02B 5/1876 |
| 9,291,828 B2 | 3/2016 | Kroll et al. | |
| 9,389,586 B2 | 7/2016 | Liu et al. | |
| 9,746,684 B2 | 8/2017 | Kroll et al. | |
| 10,120,335 B2 * | 11/2018 | Rotschild | G02B 27/2271 |
| 2010/0033782 A1 | 2/2010 | Olaya | |
| 2010/0067077 A1 | 3/2010 | Kroll et al. | |
| 2010/0194854 A1 | 8/2010 | Kroll et al. | |
| 2014/0016051 A1 | 1/2014 | Kroll et al. | |
| 2016/0091861 A1 | 3/2016 | Liu et al. | |
| 2016/0202593 A1 | 7/2016 | Kroll et al. | |
| 2017/0357098 A1 | 12/2017 | Kroll et al. | |

FOREIGN PATENT DOCUMENTS

| | | |
|---|---|---|
| CN | 101611355 B | 12/2012 |
| CN | 103384854 A | 11/2013 |
| CN | 203825374 U | 9/2014 |
| CN | 104394393 A | 3/2015 |
| CN | 104618706 A | 5/2015 |
| CN | 105423911 A | 3/2016 |
| WO | 2007/131817 A1 | 11/2007 |

OTHER PUBLICATIONS

International Search Report and Written Opinion, including English translation of Box V, of the Written Opinion, for International Application No. PCT/CN2017/088236, dated Sep. 1, 2017, 16 pages.

* cited by examiner

HOLOGRAPHIC DISPLAY DEVICE INCLUDING SPATIAL LIGHT MODULATOR AND LIGHT DIRECTING UNIT CONVERGING OUTPUT LIGHT OF THE SPATIAL LIGHT MODULATOR, AND METHOD FOR CONTROLLING THE SAME

CROSS-REFERENCE TO RELATED APPLICATION

This application is a U.S. national phase application of International Application No. PCT/CN2017/088236, filed on 14 Jun. 2017, which has not yet published, and claims priority to Chinese Patent Application No. 201610916464.6, filed with the State Intellectual Property Office of China on Oct. 20, 2016, the contents of which are incorporated herein by reference in their entirety.

BACKGROUND OF THE DISCLOSURE

Field of the Disclosure

The present disclosure relates to the technical field of display, and in particular, to a holographic display device and a method for controlling the holographic display device.

Description of the Related Art

As three dimensional display technology becomes popular and widely used increasingly, holographic display technology has entered gradually into lives and work of the people. Holographic reconstruction which is different from parallax stereo display technology has advantages such as large depth of field and no vertigo.

In general, the holographic display includes a process for recording holographic images and a process for reconstructing holographic images. In view of this, in order to achieve dynamic holographic display, the process for recording the holographic images may be implemented by holographic calculation and the holographic image coded data may be obtained.

SUMMARY

An embodiment of the present disclosure provides a holographic display device and a method for controlling the holographic display device. They can at least partly alleviate limitation on view range of holographic display.

An embodiment of the present disclosure provides a holographic display device, including a light source, a spatial light modulator, an adjustable light directing device and a direction controller, wherein the spatial light modulator is arranged at a light exit side of the light source and configured to modulate a reading light supplied by the light source and to emit an output light; wherein the direction controller is connected to the adjustable light directing device and configured to set an optical path of the output light depending on an observation position and to output a control signal to the adjustable light directing device depending on the optical path, the optical path being matched with the observation position; wherein the adjustable light directing device is arranged on an light exit side of the spatial light modulator and configured to adjust a direction of the output light of the spatial light modulator in response to the control signal outputted by the direction controller to direct the output light to the observation position along the optical path.

In an embodiment, the holographic display device further includes a positioning device connected to the direction controller and configured to detect the observation position, and the direction controller is configured to set the optical path of the output light depending on the observation position detected by the positioning device.

In an embodiment, the adjustable light directing device includes a first light directing unit and a second light directing unit, and the control signal outputted by the direction controller includes a first control signal and a second control signal, wherein the first light directing unit is configured to receive the first control signal from the direction controller and direct the output light to the second light directing unit along the optical path, and the second light directing unit is configured to receive the second control signal from the direction controller and direct an exit light of the first light directing unit to the observation position along the optical path.

In an embodiment, the first light directing unit is configured to converge the output light of the spatial light modulator before transporting the output light of the spatial light modulator to the second light directing unit.

In an embodiment, the first light directing unit includes a first lens and a pinhole filter arranged at a light exit side of the first lens, at least one pinhole being arranged in the pinhole filter; and wherein the first lens is connected to the direction controller and configured to direct the output light into one of the pinholes in the pinhole filter.

In an embodiment, the second light directing unit includes at least one concave mirror; and wherein each of the concave mirrors is connected to the direction controller and configured to reflect an exit light at one pinhole to the observation position.

In an embodiment, the second light directing unit further includes a lens group at a light exit side of the pinhole filter, the lens group including one second lens or at least two second lenses arranged side by side; and wherein the concave mirrors are arranged on a non-light-transmission side of the lens group, and a sum of number of the concave mirrors and number of the second lenses is same to number of the pinholes; and wherein each of the second lenses is connected to the direction controller and configured to converge the exit light at one pinhole to one observation position.

In an embodiment, the concave mirrors are spherical mirrors.

In an embodiment, the spherical mirrors each have a central axis in coincidence with a center of the lens group.

In an embodiment, the second lenses are convex lenses.

In an embodiment, the first light directing unit further includes a third lens which is arranged at a side of the pinhole filter close to the first lens and faces towards the position of the pinhole of the pinhole filter, the third lens being configured to converge the exit light of the first lens.

In an embodiment, the first lens is a liquid crystal lens or a convex lens.

In an embodiment, the spatial light modulator is a liquid crystal spatial light modulator.

In an embodiment, the light source includes a laser emitter and a beam expander collimating lens arranged at a light exit side of the laser emitter; or the light source includes an LED light source.

An embodiment of the present disclosure provides a method for controlling the holographic display device as described in any one of the above embodiments, the method including: modulating the reading light supplied by the light source and emitting the output light by the spatial light modulator in response to a writing signal; setting the optical path of the output light depending on the observation position and outputting the control signal to the adjustable light directing device depending on the optical path by the direction controller, the optical path being matched with the observation position; and receiving the control signal and adjusting the direction of the output light of the spatial light modulator in response to the control signal outputted by the direction controller to direct the output light to the observation position along the optical path by the adjustable light directing device.

In an embodiment, the method further includes: detecting the observation position by a positioning device before setting the optical path of the output light by the direction controller depending on the observation position.

In an embodiment, the adjustable light directing device includes a first light directing unit and a second light directing unit, and the control signal outputted by the direction controller includes a first control signal and a second control signal, wherein the first light directing unit is configured to receive the first control signal from the direction controller and direct the output light to the second light directing unit along the optical path, and the second light directing unit is configured to receive the second control signal from the direction controller and direct an exit light of the first light directing unit to the observation position along the optical path.

In an embodiment, the first light directing unit is configured to converge the output light of the spatial light modulator before transporting the output light of the spatial light modulator to the second light directing unit.

In an embodiment, the positioning device detects at least two observation positions, and the first light directing unit includes a first lens and a pinhole filter, and the second light directing unit includes at least two concave mirrors, and number of the concave mirrors is same to number of pinholes in the pinhole filter, and wherein after detecting the observation positions by the positioning device, the method includes:

based on the observation positions, setting a plurality of optical paths in one-to-one coincidence with the observation positions respectively and outputting the first control signal to the first lens and outputting the second control signal to the concave mirrors depending on the optical paths, by the direction controller;

adjusting a deflection angle of the output light passing through the first lens by the first lens in response to the first control signal, and directing the output light into each of the pinholes in time sequence along different optical paths respectively and transporting the light passing through each of the pinholes to one concave mirror along an optical path, by the first lens;

receiving the second control signal by the concave mirror and reflecting the light incident on the concave mirror to the observation position matched with the optical path.

In an embodiment, the positioning device detects at least two observation positions, and the first light directing unit includes a first lens and a pinhole filter, and the second light directing unit includes a lens group and concave mirrors arranged on a non-light-transmission side of the lens group and a sum of number of the concave mirrors and number of the second lenses is same to number of the pinholes, and wherein after detecting the observation positions by the positioning device, the method includes:

based on the observation positions, setting a plurality of optical paths in one-to-one coincidence with the observation positions respectively and outputting the control signals to the first lens, the second lenses and the concave mirrors depending on the optical paths, by the direction controller;

adjusting a deflection angle of the output light passing through the first lens by the first lens in response to the control signals, and directing the output light into each of the pinholes in time sequence along different optical paths respectively and transporting the light passing through each of the pinholes to one second lens or one concave mirror along an optical path, by the first lens, receiving the control signals and converging the light incident on the second lens to the observation position matched with an optical path by the second lens, receiving the control signals and reflecting the light incident on the concave mirror to the observation position matched with another optical path by the concave mirror.

In an embodiment, the first lens is a convex lens and the deflection angle of the output light passing through the first lens is adjusted by adjusting a deflection angle of the convex lens.

In an embodiment, the first lens is a liquid crystal lens and the deflection angle of the output light passing through the first lens is adjusted by adjusting a focal length and a light emitting direction of the liquid crystal lens.

BRIEF DESCRIPTION OF THE DRAWINGS

In order to explain the technical solutions of embodiments of the present disclosure or those in the prior art more explicitly, figures required for describing the embodiments or the prior art will below be described briefly. Apparently, the following figures are only intended to show some of embodiments of the present disclosure. The skilled person in the art may also obtain other figures from those without any creative efforts.

DETAILED DESCRIPTION OF PREFERRED EMBODIMENTS OF THE DISCLOSURE

Figure 1A:
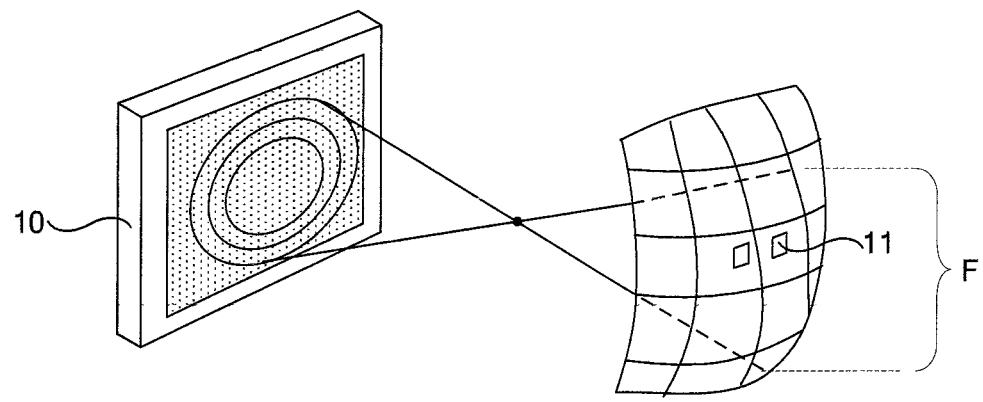
FIG. 1a is a schematic view showing a holographic display device in holographic display.

Technical solutions in the embodiments of the present disclosure will below be explained clearly and entirely with reference to figures in embodiments of the present disclosure. Apparently, the described embodiments are only some of embodiments in the present disclosure, instead of all of embodiments. All of other embodiments derived by the skilled person in the art without any creative efforts belong to scope of the present disclosure.

In accordance with a general concept, an embodiment of the present disclosure provides a holographic display device, including a light source, a spatial light modulator, an adjustable light directing device and a direction controller, wherein the spatial light modulator is arranged at a light exit side of the light source and configured to modulate a reading light supplied by the light source and to emit an output light; wherein the direction controller is connected to the adjustable light directing device and configured to set an optical path of the output light depending on an observation position and to output a control signal to the adjustable light directing device depending on the optical path, the optical path being matched with the observation position; wherein the adjustable light directing device is arranged on an light exit side of the spatial light modulator and configured to adjust a direction of the output light of the spatial light modulator in response to the control signal outputted by the controller to direct the output light to the observation position along the optical path.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In an example, holographic image coded data are directly inputted into a holographic display device 10 shown in FIG. 1a to reconstruct a holographic image. However, development of the above dynamic holographic reconstruction technology is also limited by hardware conditions. This technology needs a data processing system to perform a great deal of operations rapidly.

Figure 1B:
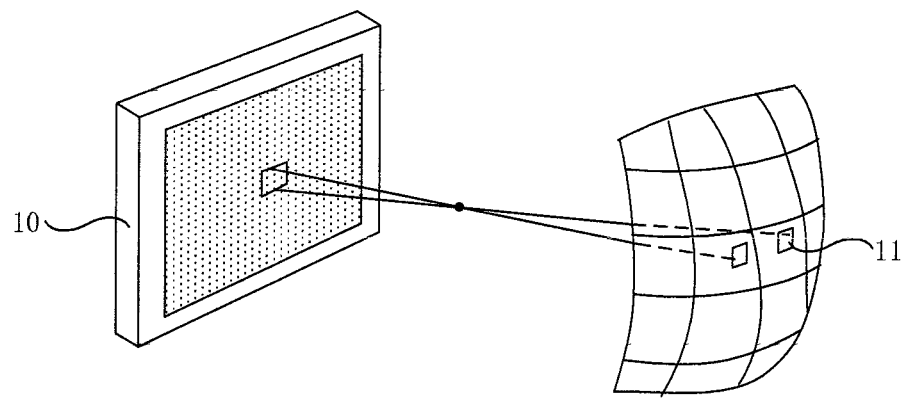
FIG. 1b is a schematic view showing another holographic display device in holographic display.

In conventional holographic reconstruction shown in FIG. 1a, it may form a large observation region F, but in such large observation region F, any regions cannot be observed other than the regions in which two windows 11 corresponding to pupils of eyes are located, thereby causing information waste. In view of this, a solution may also be used, in which only hologram information that contributes to the regions in which two windows 11 for both eyes are located is calculated and positions of eyeballs are traced by eyeball tracing technology, as shown in FIG. 1b, such that all or most of the reconstructed holographic images are transmitted to the regions in which the two windows 11 are located. In this way, a viewer may enjoy real holographic three dimensional images. It can reduce calculations of data. However, although the above solution may reduce calculation, it may cause the user has to view holographic images only in the regions in which the windows 11 for both eyes are located, thereby limiting mobile range of the viewer.

Figure 2:
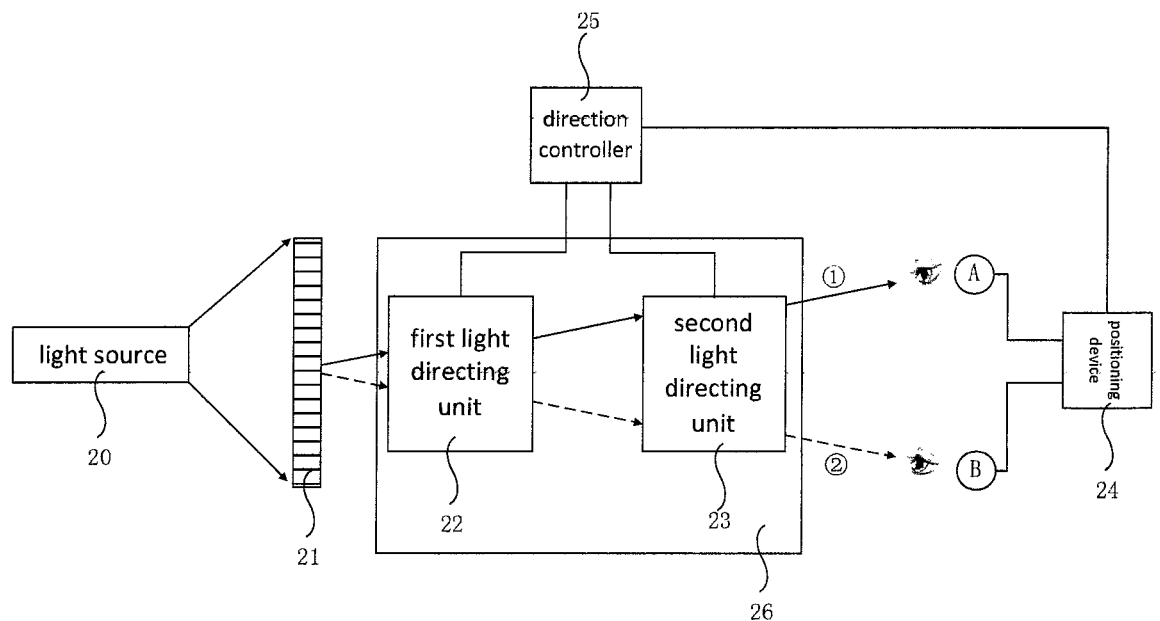
FIG. 2 is a schematic view showing a structure of a holographic display device provided by an embodiment of the present disclosure.

An embodiment of the present disclosure provides a holographic display device. As shown in FIG. 2, the holographic display device includes a light source 20, a spatial light modulator (abbreviated as SLM) 21, an adjustable light directing device 26, a positioning device 24 and a direction controller 25.

In an example, the spatial light modulator 21 is arranged at a light exit side of the light source 20. The spatial light modulator 21 is configured to modulate a reading light supplied by the light source 20 and to emit an output light, for example, it may modulate the reading light supplied by the light source 20 under control of a writing signal.

It should be noted that the above spatial light modulator 21 is a device for modulating spatial distribution of optical waves. Specifically, a plurality of independent small elements are provided on the spatial light modulator 21. These independent small elements may be called as pixels of the spatial light modulator 21. The above writing signal includes information for controlling the above pixels, and the above information may be transmitted to the corresponding pixel positions by an addressing process, such that one dimensional or two dimensional distribution of some parameters of the optical waves such as phase, amplitude or intensity, frequency, polarization state can be transferred or modulated under control of the writing signal, so as to write the information carried by the writing signal into devices that may be read by the reading light by the above addressing process. The above writing signal may be an optical signal or an electrical signal.

As an example, the above spatial light modulator 21 may be a liquid crystal spatial light modulator. Specifically, the liquid crystal layer may be used as light modulation material and different electrical fields may be applied to respective regions on the liquid crystal layer, so as to change alignment orientation and positions of liquid crystal molecules and cause variation of its optical properties.

In addition, the above positioning device 24 is connected with the direction controller 25 and configured to detect the observation position (for example, the observation position A or observation position B). The above observation position is the position in which the user's eyes are located.

It should be noted that the above positioning device 24 may for example a camera. By means of the camera, it may trace line of sight or eyeballs of the user, so as to determine the position of the user's eyes and detect the above observation position. In addition, the direction controller 25 is also connected to the adjustable light directing device 26. The direction controller 25 is configured to set an optical path ① (and/or an optical path ②) of the output light depending on the observation position A (and/or the observation position B) and to output a control signal to the adjustable light directing device 26 depending on the optical path.

The above optical path means a path along which the output light emitted from the spatial light modulator 21 travels. The optical path is matched with the observation position. For example, the optical path ① is matched with the observation position A, such that the output light emitted from the spatial light modulator 21 can travel along the optical path ①, and are finally transmitted to the user's eyes at the observation position A. Or, the optical path ② is matched with the observation position B, such that the output light emitted from the spatial light modulator 21 can travel along the optical path ②, and are finally transmitted to the user's eyes at the observation position B.

On a basis of this, the adjustable light directing device 26 is arranged on an light exit side of the spatial light modulator 21 and configured to adjust a direction of the output light of the spatial light modulator 21 in response to the control signal outputted by the direction controller 25 to direct the output light to the observation position along the optical path. The adjustable light directing device 26 has a function of keeping the output light to reach the predetermined observation position along the optical path set by the direction controller 25 by changing the direction of the output light of the spatial light modulator 21.

Figure 10:
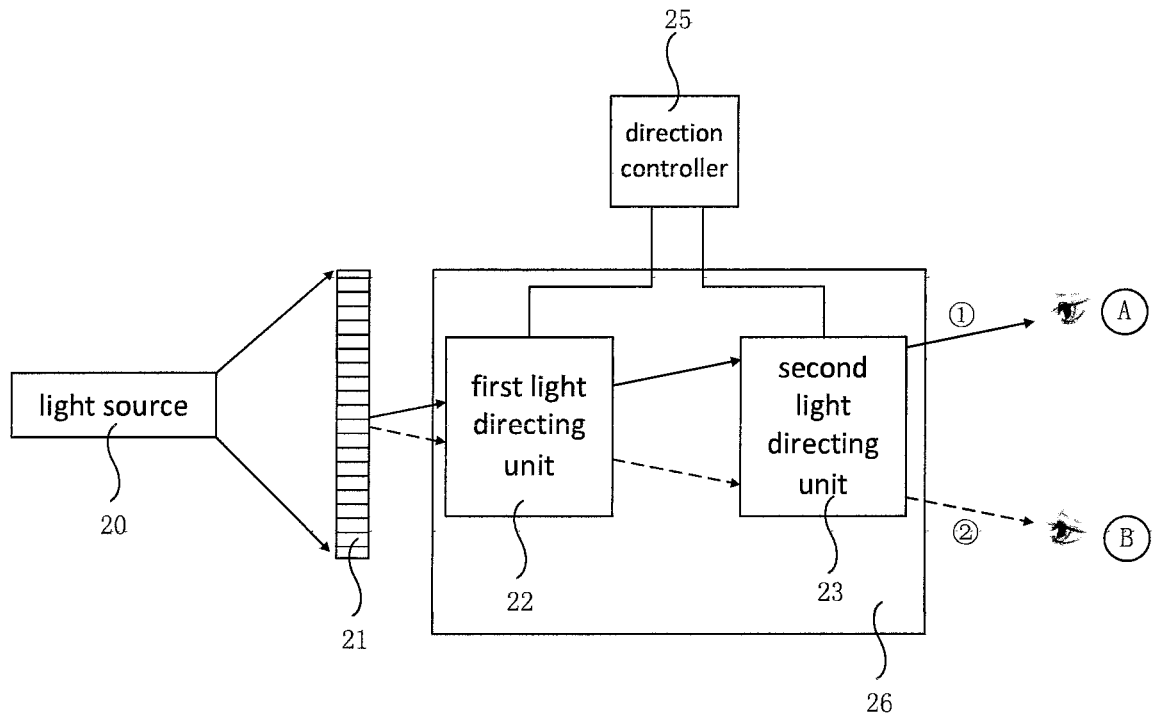
FIG. 10 is a schematic view showing a structure of another holographic display device provided by an embodiment of the present disclosure.

In the above embodiment, the observation position of the user is detected by the positioning device 24. The skilled person in the art should understand that, in the embodiments of the present disclosure, the positioning device 24 is not a necessary component. For example, the observation position of the user may be predetermined, instead of being detected by the positioning device 24. For example, in an example, a plurality of observation positions may be set in advance, and if certain conditions are satisfied, the direction controller 25 may set the optical path depending on different observation positions to adjust the adjustable light directing device 26 correspondingly. FIG. 10 shows an embodiment of a holographic display device which does not include the positioning device.

As an example, as shown in FIG. 2, the adjustable light directing device 26 may include a first light directing unit 22 and a second light directing unit 23. In this case, the direction controller 25 supplies a first control signal to the first light directing unit 22 and supplies a second control signal to the second light directing unit 23. The first light directing unit 22 is configured to receive the first control signal from the direction controller and direct the output light to the second light directing unit 23 along the optical path ① (or the optical path ②). The second light directing unit 23 is configured to receive the second control signal from the direction controller 25 and direct an exit light of the first light directing unit 22 to the observation position A (or the observation position B) along the optical path ① (or the optical path ②).

As an example, the first light directing unit 22 may be configured to converge the output light of the spatial light modulator 21 before transporting the output light of the spatial light modulator 21 to the second light directing unit 23.

In summary, the reading light supplied by the light source may reconstruct holographic images after it passes through the spatial light modulator, that is, holographic display. The above output light constructing the holographic images may be incident to the observation position along the optical path set by the direction controller, by means of the adjustable light directing device, such that the user at the observation position can observe the holographic images constructed by the above output light. In this case, when the observation position of the user changes, the positioning device can transport the updated observation position information to the direction controller, such that the direction controller generates the optical path matched with the updated observation position and the above output light can be outputted along the updated optical path to the observation position matched with the optical path through the directing function of the adjustable light directing device. In this way, after the observation position at which the user watches holographic display changes, the travel path of the output light will also change correspondingly and finally the output light is transported to the changed observation position, so as to remove the limitation on the positions of windows shown in FIG. 1b and to enhance the view range of the holographic display. In addition, when the plurality of users obverse, the positioning device can transmit different observation position information to the direction controller such that the direction controller generates optical paths in one-to-one correspondence with the plurality of observation positions and then directs the above output light along different optical paths in sequence to the observation positions matched with the respective optical paths by means of directing function of the adjustable light directing device. In view of this, the users located at different observation positions receive the holographic images at different times, but the user cannot feel the difference in transmission of the above signals because brain of the human being has persistence of vision effects to the observed images. In this way, it may achieve effects of synchronous observation of a plurality of persons.

The exemplified structures of the first light directing unit 22 will be explained below.

Figure 3:
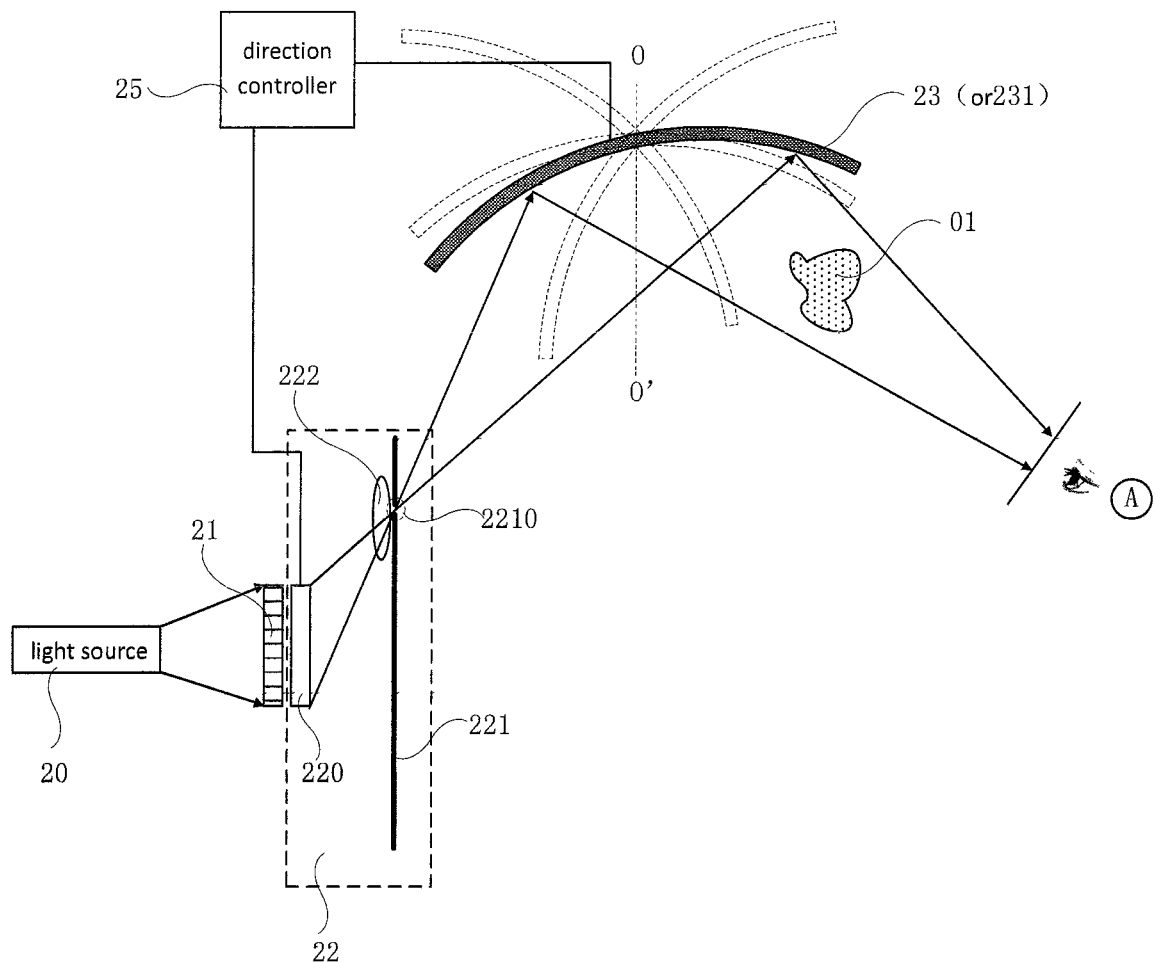
FIG. 3 is a schematic view showing an exemplified structure of a first light directing unit and an exemplified structure of a second light directing unit shown in FIG. 2.

In particular, as shown in FIG. 3, the first light directing unit 22 includes a first lens 220 and a pinhole filter 221 arranged at a light exit side of the first lens 220, and at least one pinholes 2210 are arranged on the pinhole filter 221.

It should be noted that light modulated by the spatial light modulator 21 has diffraction waves with a plurality of diffraction orders and the diffraction waves at ±1 order have large intensity and the diffraction waves at other diffraction orders have too weak intensity to reconstruct hologram. Thus, the above pinhole filter 221 may filter the incident light by the pinholes 2210 in the pinhole filter 221 to output the diffraction waves with desired diffraction orders, for example, the diffraction waves at ±1 order, so as to facilitate holographic reconstruction.

In an example, the first lens 220 is connected to the direction controller 25 and the direction controller 25 may control a deflection angle of the light emitted from the first lens 220. In particular, when the first lens 220 is a convex lens, the above direction controller 25 may control the deflection angle of the convex lens, to achieve the objective of controlling the deflection angle of the light emitted from it. The control of the direction controller 25 to the deflection angle of the convex lens may for example be achieved by applying electrical signals to the actuator of the convex lens.

Or, the above first lens 220 is a liquid crystal lens which has function of adjusting focal length and light emitting direction. For example, the electrical signal may be applied by the direction controller 25 to the liquid crystal lens to control the liquid crystal lens for adjusting the light emitting direction and focal length, and finally achieve the objective of controlling the deflection angle of the light emitted from the liquid crystal lens.

In view of this, the above first lens 220 can direct the output light emitted from the spatial light modulator 21 into a pinhole 2210 of the pinhole filter 221. As the pinhole 2210 only permits the desired diffraction order to pass, the path of the output light from the first lens 220 may be limited by the pinhole 2210, such that the output light from the first lens 220 is transmitted along the path matched with the observation position (for example the observation position A) to the above second light directing unit 23.

In order to ensure all of the output light from the first lens 220 to enter the above pinholes 2210 to reduce the loss of the light in transmission as possible as it can, as an example, the first light directing unit 22 may further include a third lens 222.

In particular, the third lens 222 is arranged at a side of the pinhole filter 221 close to the first lens 220 and faces towards the position at which the pinhole 2210 of the pinhole filter 221 is, and the third lens 222 is configured to converge the exit light of the first lens 220, such that most or all of the light emitted from the first lens 220 can be transmitted to the above second light directing unit 23 by the pinhole 2210, by means of the converging effects of the third lens 222. As an example, the above third lens 222 may be a convex lens.

In view of this, when the first light directing unit 22 has the above structure, the structure of the second light directing unit may include at least one concave mirrors 231 as shown in FIG. 3.

Each of the concave mirrors 231 is connected to the direction controller 25 such that the deflection directions of the concave mirrors 231 may be controlled by the direction controller 25. Each of the concave mirrors 231 is configured to reflect the exit light at one pinhole 2210 to the observation position (for example, the observation position A).

The concave mirrors 231 can converge the light in reflection, thus, it can enhance amount of the light entering the eyes. In addition, in order to further improve the effects of convergence by reflection, the concave mirrors 231 may for example be spherical mirrors.

Further, the above spherical mirrors may rotate through 360 degrees with respect to a datum axis O-O' as shown in FIG. 3. In this way, when the user's observation position changes, the rotation angles of the spherical mirrors may be controlled by the direction controller 25, such that the light reflected by the spherical mirrors finally can be collected into the changed observation position. In this way, the user does not need to see the reconstructed holographic display image 01 at a fixed position, thus, it can enlarge the view range of the user. It should be noted that the axis about which the above spherical mirrors rotate may be arranged along any direction. For example, in the example shown in FIG. 3, the axis about which the above spherical mirrors rotate may be perpendicular to the page of the figure or be inclined with respect to the page, or even be parallel to the page.

It should be noted that in the present application, the internal structures of the first light directing unit 22 and the second light directing unit 23 may be adjusted depending on the number of the users that observe the holographic display.

Figure 4:
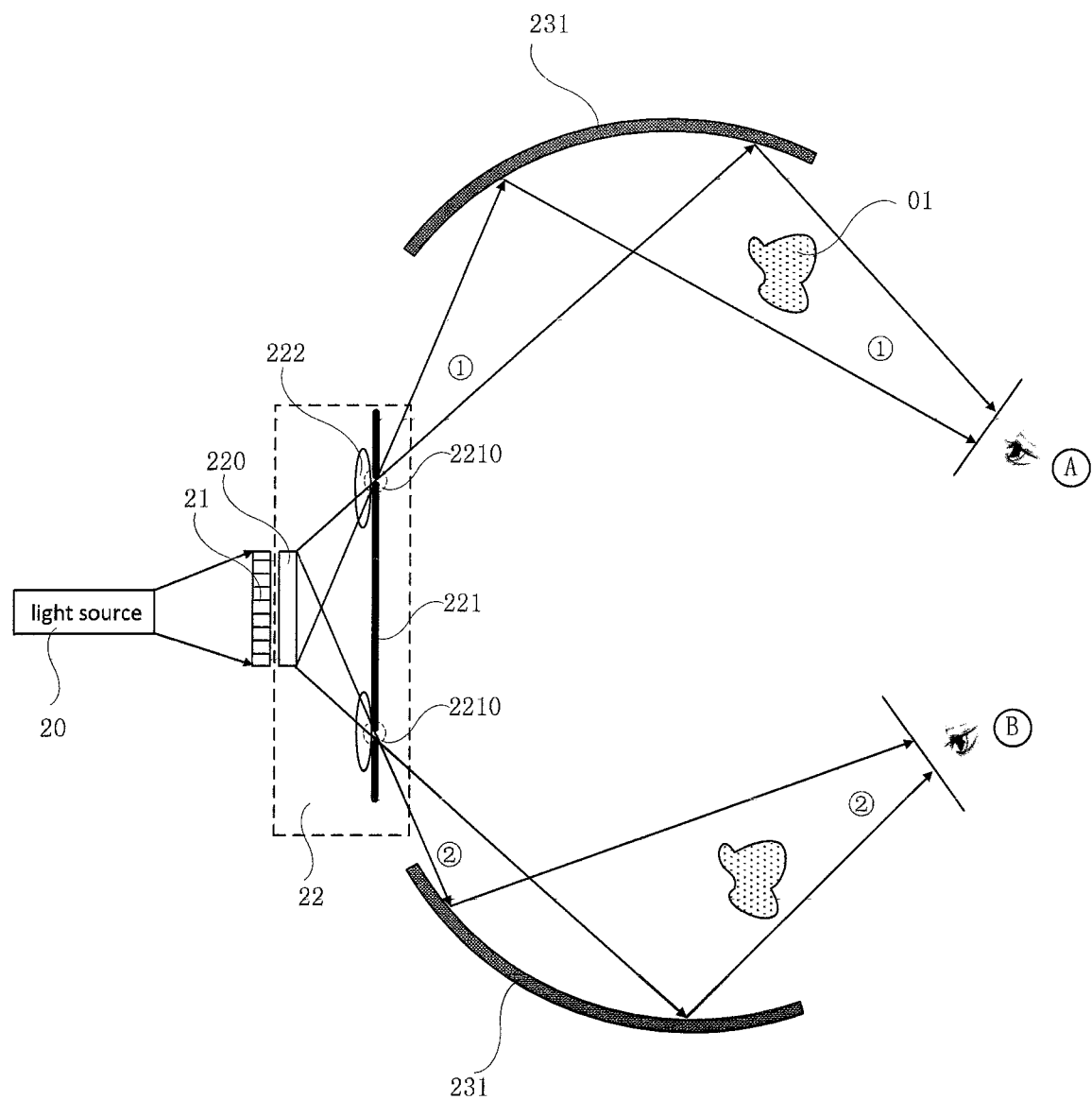
FIG. 4 is a schematic view showing another exemplified structure of the first light directing unit and another exemplified structure of the second light directing unit shown in FIG. 2.

In particular, for example, as shown in FIG. 4, when two users are located at two different observation positions, i.e., the observation position A and the observation position B respectively, two pinholes 2210 are arranged on the pinhole filter 221 in the first light directing unit 22 and the second light directing unit 23 may be composed of two concave mirrors 231 arranged on top and bottom sides of the pinhole filter 221 respectively.

In particular, the light emitted from the first lens 220 may follow the optical path matched with the observation position A. At first, it passes through an upper pinhole 2210 and is incident on a reflecting face of the upper one of the concave mirrors 231, and the light is incident into the eyes of the user at the observation position A by reflection and convergence of the concave mirror 231. And then, the light emitted from the first lens 220 again follows the optical path matched with the observation position B. It passes through a lower pinhole 2210 and is incident on a reflecting face of the lower one of the concave mirrors 231, and the light is incident into the eyes of the user at the observation position B by reflection and convergence of the concave mirror 231. As discussed above, when a plurality of users at different observation positions observe the holographic display, the output light emitted from the spatial light modulator 21 may be received in sequence by the first light directing unit 22 and the second light directing unit 23, such that the users can see reconstructed holographic images 01 in sequence.

Figure 5:
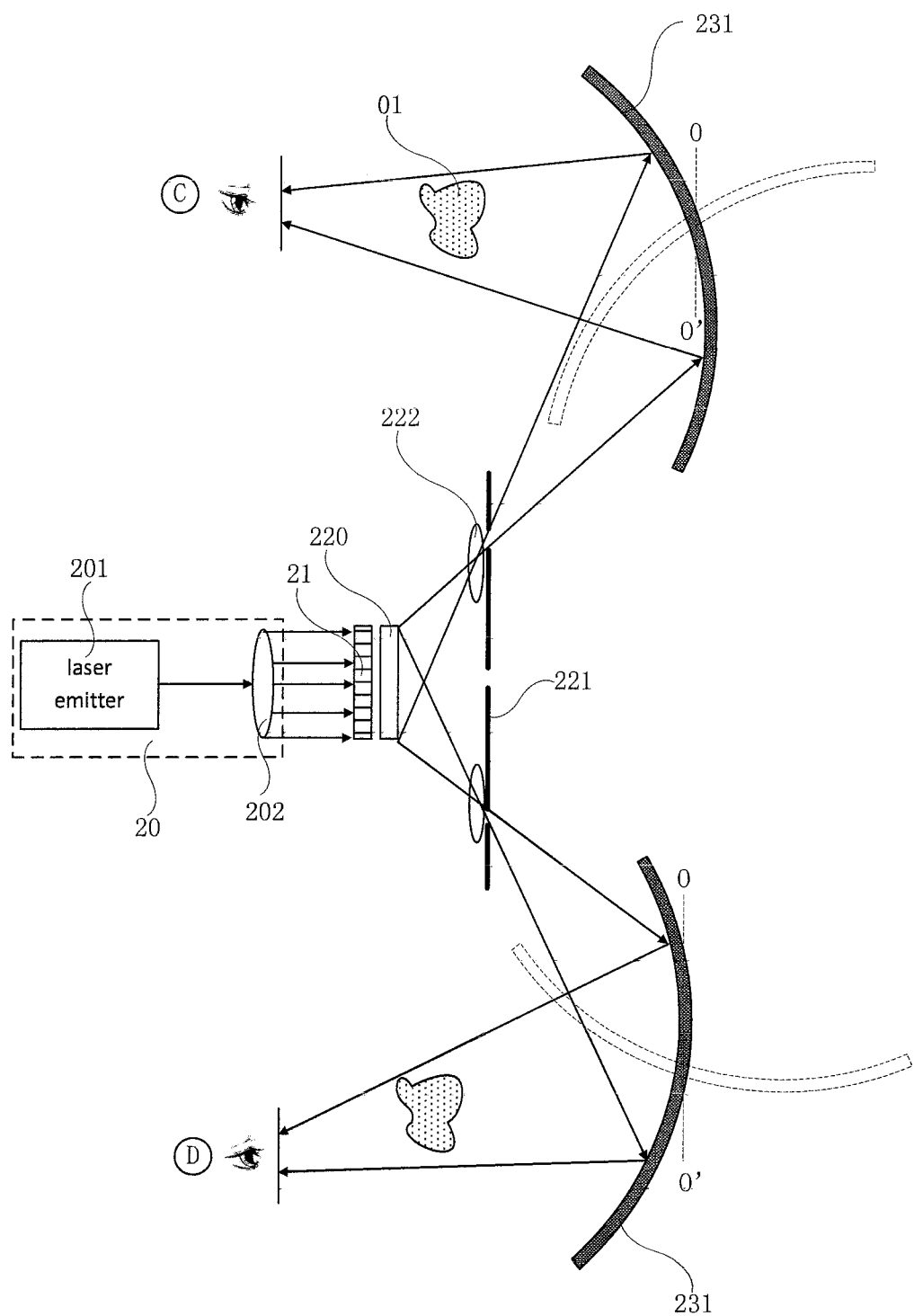
FIG. 5 is a schematic view in which concave mirrors in FIG. 4 are deflected after the observation position is changed.

In view of this, when the observation positions of two users change, for example, as shown in FIG. 5, when the observation positions are the upper observation position C and the lower observation position D respectively, the line of sight of the two users may be traced by the positioning device 24, e.g., a camera, by means of sight line tracing technology, and the above observation position C and the observation position D are detected such that the direction controller 25 can control the deflection directions of the concave mirrors 231 located below and above the pinhole filter 221. In this way, the light emitted from the first lens 220 can pass through the upper pinhole 2210 and be incident on a reflecting face of the deflected upper concave mirror 231 along the optical path matched with the observation position C, and the light is incident to the user's eyes at the observation position C through the reflection and convergence of the concave mirror 231. Then, the light emitted from the first lens 220 can pass through a lower pinhole 2210 and be incident on a reflecting face of the deflected lower concave mirror 231 along the optical path matched with the observation position D, and the light is incident to the user's eyes at the observation position D through the reflection and convergence of the concave mirror 231. In this way, on one hand, it can achieve multiple persons to observe holographic display; on the other hand, the user does not need to observe the reconstructed holographic display images 01 at a fixed position, thus it can extend the view range of the users.

It should be noted that in the description of the present application, the terms associated with positions such as "upper" and "lower" all may be explained with reference to the position at which the holographic display device is placed in Figures. When the orientation and position of the holographic display device change, the above terms associated with positions may change correspondingly. The details will be omitted herein.

In summary, when the number of the users that observe the holographic display increases, the number of the pinholes 2210 in the pinhole filter 221 and the number of the concave mirrors 231 may increase correspondingly, such that the light emitted from the first lens 220 travels along an optical path matched with an observation position by means of light directing effects of a group of pinholes 2210 and concave mirrors 231, and finally the light is transmitted into the user's eyes at the observation position.

When a plurality of users observe at the same time, in an optional embodiment, a same frame of picture may be switched among a plurality of pinholes 2210 rapidly at a certain time. In this way, the plurality of users can almost observe the same frame of picture due to persistence of vision effect of eyes. At the next time, the next frame of picture is switched among the plurality of pinholes 2210 rapidly such that the plurality of users can observe a continuous picture to achieve effects of simultaneous observation of multiple persons.

However, when the number of the users is too large, the number of the required concave mirrors 231 may also increase. In this way, under control of the direction controller 25, the travel paths of the reflected lights from the plurality of concave mirrors 231 that have been deflected may be overlapped so as to disturb the holographic picture 01 and degrade display effects.

Figure 6:
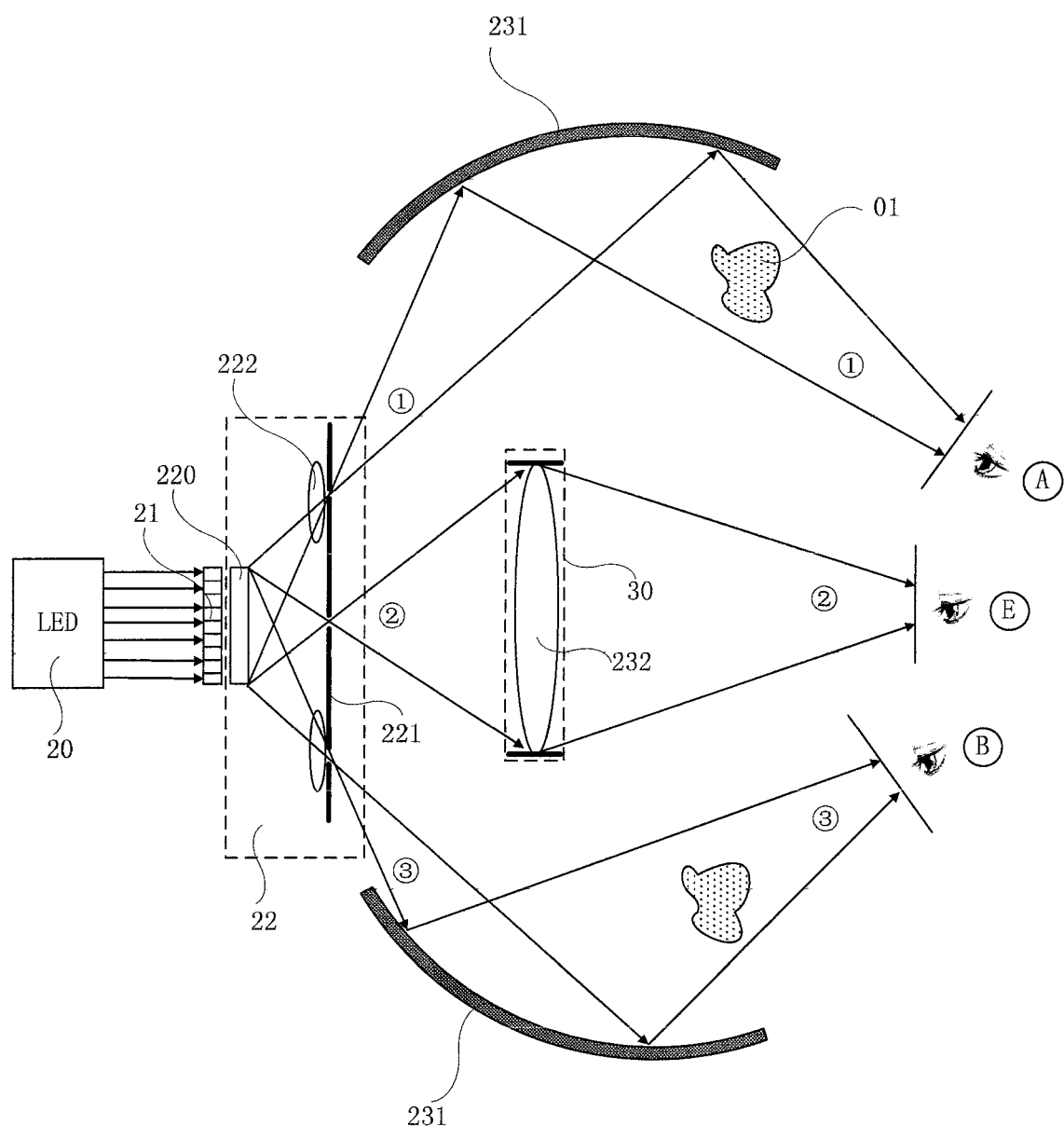
FIG. 6 is a schematic view showing a further exemplified structure of the first light directing unit and a further exemplified structure of the second light directing unit shown in FIG. 2.
Figure 7:
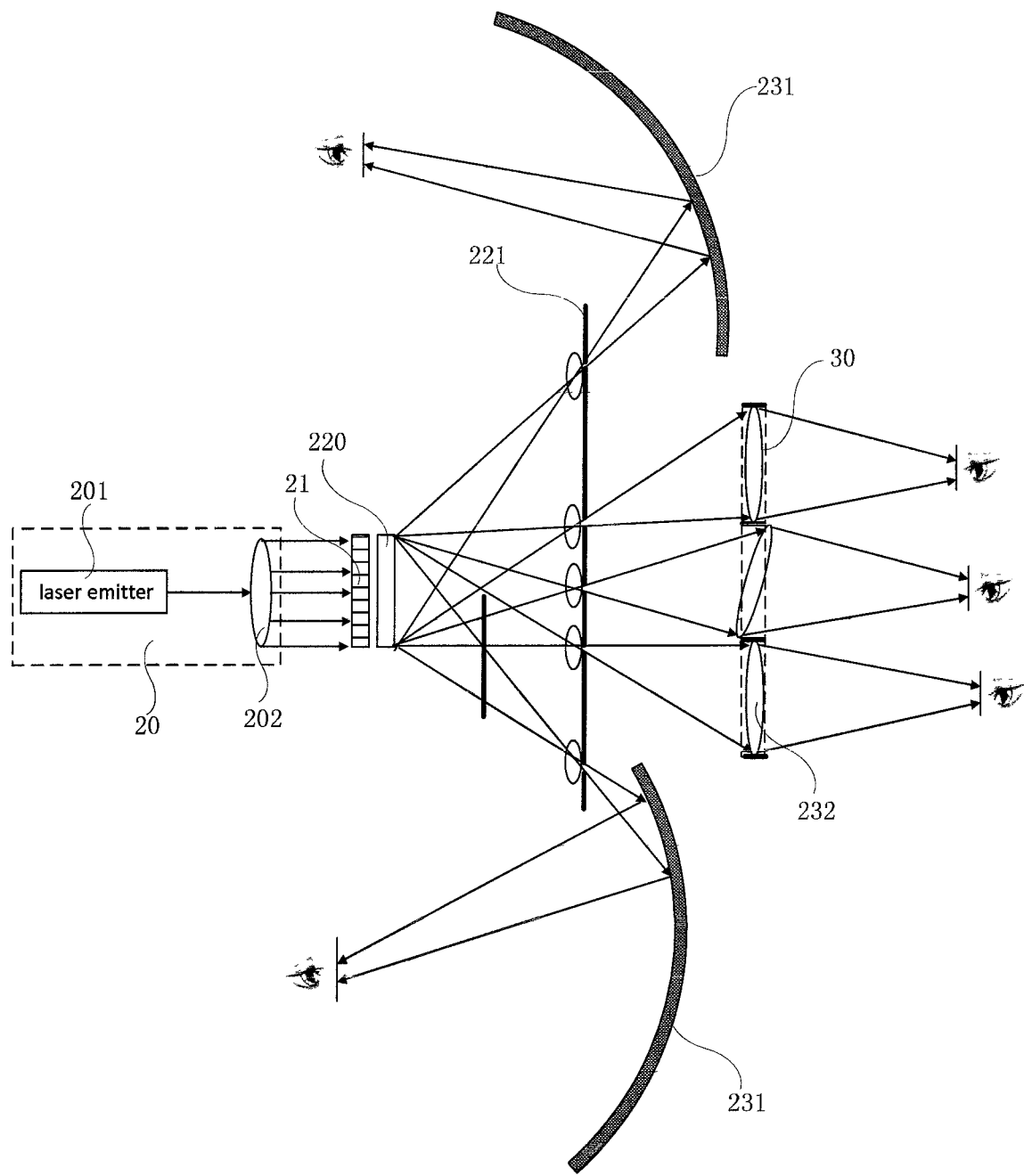
FIG. 7 is a schematic view showing a yet further exemplified structure of the first light directing unit and a yet further exemplified structure of the second light directing unit shown in FIG. 2.

In order to solve the above problem, when the first light directing unit 22 has the structure as described above, the second light directing unit 23 may have structure as shown in FIG. 6 or FIG. 7, which includes a lens group 30 at a light exit side of the pinhole filter 221. The lens group 30 shown in FIG. 6 may include one second lens 232, or the lens group 30 shown in FIG. 7 may include at least two second lenses 232 arranged side by side.

It should be noted that the above phrase of "at least two second lenses 232 arranged side by side" means centers of these lenses 232 are located in one same plane.

In a further embodiment, the concave mirrors 231 may be arranged on a non-light-transmission side of the lens group 30. The term of "non-light-transmission side of the lens group 30" means that sides of the lens group 30 that are not associated with the light transmission path other than the surface at which the light entrance side is located and the surface at which the light exit side is located, for example, non-light-transmission side of the lens group 30 may be a top side and a bottom side of the lens group 30 shown in FIG. 6 or FIG. 7.

As an example, sum of number of the concave mirrors 231 and number of the second lenses 232 are same to number of the pinholes 2210. In this way, the light emitted from one pinhole 2210 may travel to the concave mirror 231 or the second lens 232 along the optical path matched with different observation positions. Thus, the number of the pinholes 2210 is same to the number of the observation positions.

In a further embodiment, each of the second lenses 232 may be connected to the direction controller 25 such that the direction controller 25 may adjust the deflection direction of each second lens 232 independently. The second lens 232 may be a convex lens and the deflection direction of the convex lens may be controlled. On a basis of this, each second lens 232 is configured to converge the exit light at one pinhole 2210 to one observation position.

In this way, the above lens group 30 may converge the holographic image into the user's eyes at an intermediate position in the holographic display device, by means of respective second lenses 232 in the lens group 30. The concave mirrors 231 may converge the holographic images to the user's eyes at the positions such as the edge of the holographic display device other than the above intermediate position.

Thus, as an example, the concave mirrors 231 may be arranged both on the top side and the bottom side of the pinhole filter 221 as shown in FIG. 6 or FIG. 7, to further increase the number of the users observing the images. In addition, when the concave mirrors 231 may be arranged both on the top side and the bottom side of the pinhole filter 221, as shown in FIG. 7, some of users may observe the holographic images 01 at the back side of the holographic display device by controlling the deflection angles of the concave mirrors 231. In this way, when the number of users is relatively large, the user may be dispersed around the holographic display device to avoid congestion. For example, when the holographic display device is used in a transparent exhibition stand of a museum to reconstruct holographic images 01 of a cultural relic, the visitors may be distributed around the exhibition stand to observe the images, instead of being crowded in the front side of the holographic display device. It may improve comfort level for observing images.

Figure 8:
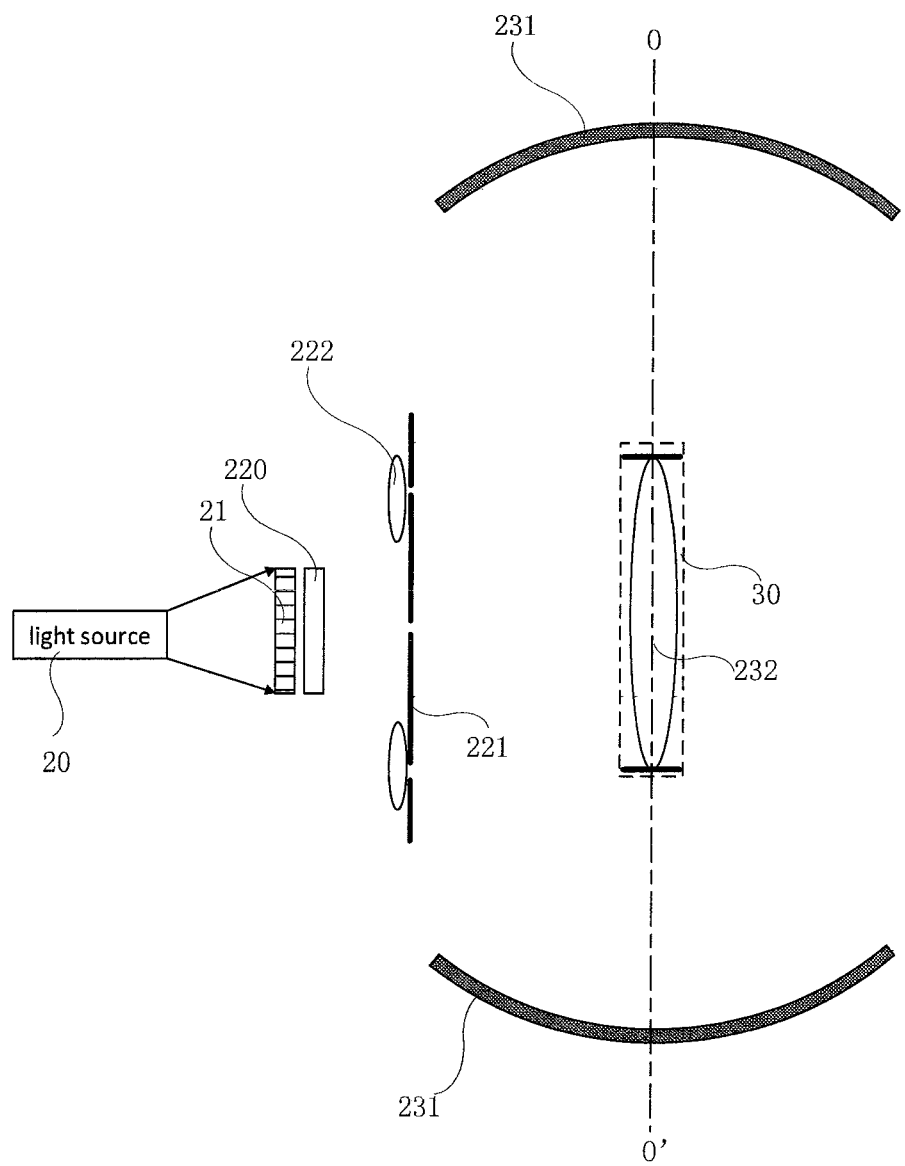
FIG. 8 is a schematic view showing exemplified positions of the concave mirrors and a prism group in FIG. 6.

As an example, in case that the concave mirrors 231 are spherical mirrors, it is desired that there is a reduced chance of overlapping the exit light from the deflected spherical mirrors with that from the lens group 30 under control of the direction controller 25. Optionally, as shown in FIG. 8, the center of the lens group 30 coincides with the central axis (O-O') of the spherical mirrors.

In addition, when the first light directing unit 22 has the above structure, the structure of the second light directing unit 23 may only include the lens group 30 as shown in FIG. 7. At that time, the number of the second lenses 232 in the lens group 30 is same to the number of the pinholes 2210, such that the exit light from each pinhole 2210 can be directed to one second lens 232 and the second lens 232 converges the exit light from the pinhole 2210 to one observation position. In order to control the deflection angle of each second lens 232, each second lens 232 needs to be connected with the above direction controller 25.

It should be noted that, in order to reconstruct the holographic images 01, the light provided by the light source 20 is a coherent light.

In this case, as illustrated in FIG. 5, the light source 20 includes a laser emitter 201 and a beam expander collimating lens 202 arranged at a light exit side of the laser emitter 201. In this way, a line light source provided by the laser emitter 201 may be converted by the beam expander collimating lens 202 into a collimated light beam to provide an area light source.

Or, as illustrated in FIG. 6, the light source 20 may include an LED (light emitting diode) light source.

Figure 9:
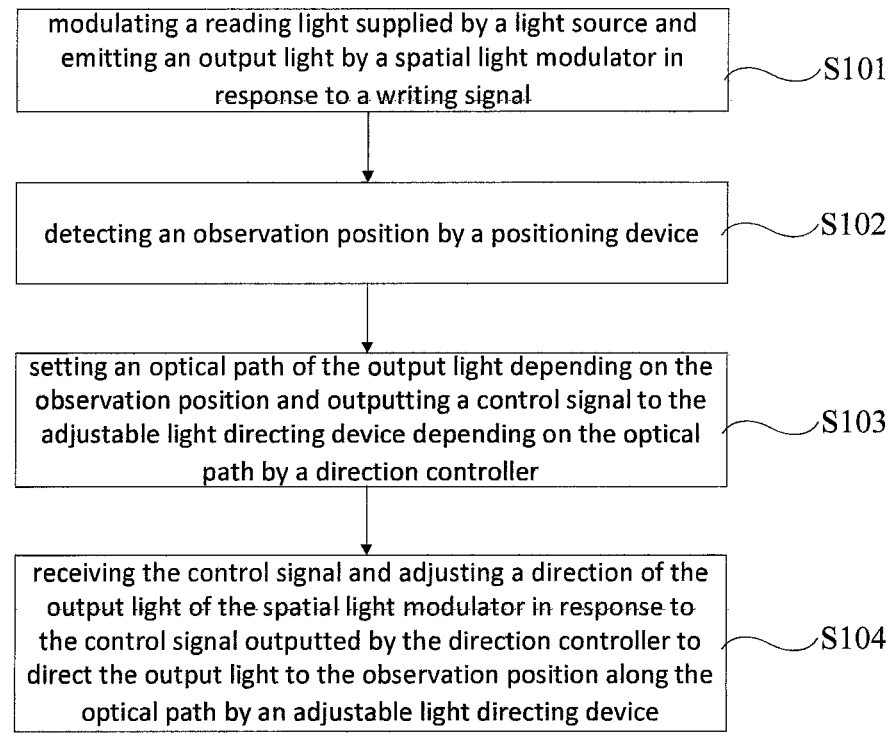
FIG. 9 is a flow chart of a process for controlling a holographic display device provided by an embodiment of the present disclosure.

An embodiment of the present disclosure provides a method for controlling the holographic display device as described in any one of the above embodiments. As shown in FIG. 9, the method includes:

S101: modulating a reading light supplied by a light source 20 and emitting an output light by a spatial light modulator 21 as shown in FIG. 2 in response to a writing signal.

S102: detecting the observation position A (and/or the observation position B) by a positioning device 24.

It should be noted that sequences of the above step S101 and step S102 are not limited in the present disclosure. The step S101 may be performed before the step S102, or after the step S102, or the step S101 and the step S102 may be performed simultaneously.

S103: setting an optical path ① (and/or the optical path ②) of the output light depending on the observation position A (and/or the observation position B) and outputting a control signal to the adjustable light directing device 26 depending on the optical path by a direction controller 25.

In the step S103, the optical path is matched with the observation position.

S104: receiving the control signal and adjusting a direction of the output light of the spatial light modulator 21 in response to the control signal outputted by the direction controller 25 to direct the output light to the observation position A (or the observation position B) along the optical path ① (or the optical path ②) by an adjustable light directing device 26.

It should be noted that the above step S102 is optional, instead of necessary step. In an embodiment of the present disclosure, the observation position of the user may be determined by detection of the positioning device 24, but the observation position of the user may for example be predetermined, instead of being detected by the positioning device 24. For example, in an example, a plurality of observation positions may be set in advance, and if certain conditions are satisfied, the direction controller 25 may set the optical path depending on different observation positions to adjust the adjustable light directing device 26 correspondingly, so as to omit the step of detecting the observation position A (and/or the observation position B) by the above positioning device 24.

As an example, the adjustable light directing device 26 may include a first light directing unit 22 and a second light directing unit 23. And the direction controller 25 supplies a first control signal to the first light directing unit 22 and supplies a second control signal to the second light directing unit 23. Thus, in the above step S104, the first light directing unit 22 receives the first control signal from the direction controller 25 and directs the output light to the second light directing unit 23 along the optical path ① (or the optical path ②). The second light directing unit 23 receives the second control signal from the direction controller 25 and directs an exit light of the first light directing unit 22 to the observation position A (or the observation position B) along the optical path ① (or the optical path ②). In the above process, the first light directing unit 22 may at first adjust the direction of the output light of the light spatial modulator 21, and then the second light directing unit 23 may adjust the direction of the exit light of the first light directing unit 22. Alternatively, the second light directing unit 23 may at first adjust the direction of the exit light of the first light directing unit 22, and then the first light directing unit 22 may adjust the direction of the output light of the light spatial modulator 21; or the adjusting operations of the first light directing unit 22 and the second light directing unit 23 may be performed simultaneously.

In an example, the first light directing unit 22 converges the output light of the spatial light modulator 21 before transporting the output light of the spatial light modulator 21 to the second light directing unit 23.

In summary, the reading light supplied by the light source may reconstruct holographic images after it passes through the spatial light modulator, that is, holographic display. The above output light constructing the holographic images may be incident to the observation position along the optical path set by the direction controller, by means of the first light directing unit and the second light directing unit, such that the user at the observation position can observe the holographic images constructed by the above output light. In this case, when the observation position of the user changes, the positioning device can transport the updated observation position information to the direction controller, such that the direction controller generates the optical path matched with the updated observation position and the above output light can be outputted along the updated optical path to the observation position matched with the optical path through the directing function of the first light directing unit and the second light directing unit. In this way, after the observation position at which the user observes holographic display changes, the travel path of the output light will also change correspondingly and finally the output light is transported to the changed observation position, so as to remove the limitation on the positions of windows shown in FIG. 1b and to enhance the view range of the holographic display. In addition, when the plurality of users obverse, the positioning device can transmit different observation position information to the direction controller such that the direction controller generates optical paths in one-to-one correspondence with the plurality of observation positions and then directs the above output light along different optical paths one by one to the observation positions matched with the respective optical paths by means of directing function of the first light directing unit and the second light directing unit. In view of this, the users located at different observation positions receive the holographic images at different times, but the user cannot feel the difference in transmission of the above signals because brain of the human being has persistence of vision effects to images. In this way, it may achieve effects of synchronous observation of a plurality of persons.

As discussed above, when a plurality of users observe the holographic images 01 displayed by the holographic display device, the positioning device 24 may detect at least two observation positions. Next, when the first light directing unit 22 and the second light directing unit 23 have different structures from each other, in case that the plurality of persons observe the holographic display device, the process for controlling the holographic display device will be explained specifically.

For example, when the first light directing unit 22 as shown in FIG. 4 includes the first lens 220 and the pinhole filter 221 and the second light directing unit 23 includes at least two (for example two) concave mirrors 231 and the number of the concave mirrors 231 is same to the number of the pinholes 2210 on the pinhole filter 221, after the step S101, the method for controlling the holographic display device includes:

at first, depending on a plurality of observation positions, for example the observation position A and the observation position B as shown in FIG. 4, the above direction controller 25 sets respectively a plurality of optical paths in one-to-one correspondence with the above observation positions. For example, the optical path ① is matched with the observation position A and the optical path ② is matched with the observation position B. In addition, the direction controller 25 may output the first control signal to the first lens 220 and output the second control signal to the respective concave mirrors 231 respectively depending on the respective optical paths.

Next, the first lens 220 receives the first control signal sent by the direction controller 25, adjusts a deflection angle of the output light passing through the first lens in response to the first control signal, and directs the output light emitted from the spatial light modulator 21 into each of the pinholes 2210 in time sequence along different optical paths respectively and transports the light passing through each of the pinholes 2210 to one concave mirror 231 along an optical path.

In particular, in response to the control signal outputted by the direction controller 25, the first lens 220 at first directs the output light from the spatial light modulator 21 into the pinhole 2210 in the upper part of the pinhole filter 221 in FIG. 4 along the optical path ①, and the light passes through the pinhole 2210 and is transported to the upper concave mirror 231 along the optical path ①. At that time, in response to the control signal outputted by the direction controller 25, the concave mirror 231 reflects the light incident on the concave mirror 231 to the observation position A matched with the above optical path ①.

Next, in response to the control signal outputted by the direction controller 25, the first lens 220 at first directs the output light from the spatial light modulator 21 into the pinhole 2210 in the lower part of the pinhole filter 221 in FIG. 4 along the optical path ②, and the light passes through the pinhole 2210 and is transported to the lower concave mirror 231 along the optical path ①. At that time, in response to the control signal outputted by the direction controller 25, the concave mirror 231 reflects the light incident on the concave mirror 231 to the observation position B matched with the above optical path ①.

In this way, the users located at the observation position A and the observation position B may observe the holographic images 01 displayed by the holographic display device in sequence. Further, the users located at different observation positions receive the holographic images 01 at different times, but the user cannot feel the difference in transmission of the above signals because brain of the human being has persistence of vision effects to images. In this way, it may achieve effects of synchronous observation of a plurality of persons. Certainly, the above paragraphs only describe the example in which two users at different observation positions observe the above holographic display device simultaneously, when two or more users observe it, as such, the holographic images 01 may still be transmitted to the eyes of the user at different observation positions in sequence. The specific control process will be omitted herein.

Or, again for example, as shown in FIG. 6, when the first light directing unit 22 includes a first lens 220 and a pinhole filter 221, and the second light directing unit 22 includes a lens group 30 (for example, the lens group 30 includes one second lens 232) and concave mirrors 231 arranged on a non-light-transmission side of the lens group 30 (for example, two concave mirrors 231, i.e., an upper concave mirror and a lower concave mirror) and sum of number of the concave mirrors 231 and number of the second lenses 232 is same to number of the pinholes 2210, after the step S101, the method for controlling the holographic display device includes:

at first, depending on the plurality of observation positions, e.g., the observation position A, the observation position B and the observation position E as shown in FIG. 6, the direction controller 25 sets a plurality of optical paths in one-to-one coincidence with the observation positions respectively. For example, the optical path ① is matched with the observation position A, the optical path ② is matched with the observation position E and the optical path ① is matched with the observation position B. In addition, the direction controller 25 may output the control signals to the first lens 220 and the respective concave mirrors 231 respectively depending on the respective optical paths.

Next, the first lens 220 receives the control signal sent by the direction controller 25, adjusts a deflection angle of the output light passing through the first lens in response to the control signal, and directs the output light emitted from the spatial light modulator 21 into each of the pinholes 2210 in time sequence along different optical paths respectively and transports the light passing through each of the pinholes 2210 to one second lens 232 or one concave mirror 231 along an optical path.

In particular, in response to the control signal outputted by the direction controller 25, the first lens 220 at first directs the output light from the spatial light modulator 21 into the pinhole 2210 in the upper part of the pinhole filter 221 in FIG. 6 along the optical path ①, and the light passes through the pinhole 2210 and is transported to the upper concave mirror 231 along the optical path ①. At that time, in response to the control signal outputted by the direction controller 25, the concave mirror 231 reflects the light incident on the concave mirror 231 to the observation position A matched with the above optical path ①.

Similarly, in response to the control signal outputted by the direction controller 25, the first lens 220 at first directs the output light from the spatial light modulator 21 into the pinhole 2210 in the middle part of the pinhole filter 221 in FIG. 6 along the optical path ②, and the light passes through the pinhole 2210 and is transported to the second lens 232 along the optical path ②. At that time, in response to the control signal outputted by the direction controller 25, the second lens 232 reflects the light incident on the second lens 232 to the observation position E matched with the above optical path ②.

Finally, in response to the control signal outputted by the direction controller 25, the first lens 220 at first directs the output light from the spatial light modulator 21 into the pinhole 2210 in the lower part of the pinhole filter 221 in FIG. 6 along the optical path ③, and the light passes through the pinhole 2210 and is transported to the lower concave mirror 231 along the optical path ③. At that time, in response to the control signal outputted by the direction controller 25, the lower concave mirror 231 reflects the light incident on the lower concave mirror 231 to the observation position B matched with the above optical path ③.

In this way, the users located at the observation position A, the observation position B and the observation position E may observe the holographic images 01 displayed by the holographic display device in sequence.

In an example, the first lens is a convex lens and the deflection angle of the output light passing through the first lens may be adjusted by adjusting a deflection angle of the convex lens.

In another example, the first lens is a liquid crystal lens and the deflection angle of the output light passing through the first lens may be adjusted by adjusting a focal length and a light emitting direction of the liquid crystal lens.

All of the examples of the adjustable light directing device listed in the above embodiments, for example, including the first light directing unit and the second light directing unit in various forms, are exemplified. The embodiments of the present disclosure are not limited to this.

Only some exemplified embodiments of the present disclosure are explained in the above description. However, the scope of the present disclosure is not limited to those. Any variants or alternations that the skilled person in the art can easily envisage within the technical range of the present disclosure should fall within the scope of the present disclosure. Therefore, the scope of the present disclosure should be defined by the scope of the appended claims.

What is claimed is:

1. A holographic display device, comprising a light source, a spatial light modulator, an adjustable light directing device and a direction controller,
    wherein the spatial light modulator is arranged at a light exit side of the light source and configured to modulate a reading light supplied by the light source and to emit an output light;
    wherein the direction controller is connected to the adjustable light directing device and configured to set an optical path of the output light depending on an observation position and to output a control signal to the adjustable light directing device depending on the optical path, the optical path being matched with the observation position;
    wherein the adjustable light directing device is arranged on a light exit side of the spatial light modulator and configured to adjust a direction of the output light of the spatial light modulator in response to the control signal outputted by the direction controller to direct the output light to the observation position along the optical path,
    wherein the adjustable light directing device comprises a first light directing unit and a second light directing unit, and the control signal outputted by the direction controller comprises a first control signal and a second control signal, wherein the first light directing unit is configured to receive the first control signal from the direction controller and direct the output light to the second light directing unit along the optical path, and the second light directing unit is configured to receive the second control signal from the direction controller and direct an exit light of the first light directing unit to the observation position along the optical path, and
    wherein the first light directing unit is configured to converge the output light of the spatial light modulator before transporting the output light of the spatial light modulator to the second light directing unit.

2. The holographic display device according to claim 1, wherein the holographic display device further comprises a positioning device connected to the direction controller and configured to detect the observation position, and the direction controller is configured to set the optical path of the output light depending on the observation position detected by the positioning device.

3. A method for controlling the holographic display device according to claim 1, the method comprising:
 modulating the reading light supplied by the light source and emitting the output light by the spatial light modulator in response to a writing signal;
 setting the optical path of the output light depending on the observation position and outputting the control signal to the adjustable light directing device depending on the optical path by the direction controller, the optical path being matched with the observation position; and
 receiving the control signal and adjusting the direction of the output light of the spatial light modulator in response to the control signal outputted by the direction controller to direct the output light to the observation position along the optical path by the adjustable light directing device.

4. The method according to claim 3, further comprising: detecting the observation position by a positioning device before setting the optical path of the output light by the direction controller depending on the observation position.

5. The method according to claim 3, wherein the holographic display device further comprises a positioning device, and the positioning device detects at least two observation positions, and the first light directing unit comprises a first lens and a pinhole filter, and the second light directing unit comprises at least two concave mirrors, and number of the concave mirrors is same to number of pinholes in the pinhole filter, and wherein after detecting the observation positions by the positioning device, the method comprises:
 based on the observation positions, setting a plurality of optical paths in one-to-one coincidence with the observation positions respectively and outputting the first control signal to the first lens and outputting the second control signal to the concave mirrors depending on the optical paths, by the direction controller;
 adjusting a deflection angle of the output light passing through the first lens by the first lens in response to the first control signal, and directing the output light into each of the pinholes in time sequence along different optical paths respectively and transporting the light passing through each of the pinholes to one concave mirror along an optical path, by the first lens;
 receiving the second control signal by the concave mirror and reflecting the light incident on the concave mirror to the observation position matched with the optical path.

6. The method according to claim 5, wherein the first lens is a convex lens and the deflection angle of the output light passing through the first lens is adjusted by adjusting a deflection angle of the convex lens.

7. The method according to claim 5, wherein the first lens is a liquid crystal lens and the deflection angle of the output light passing through the first lens is adjusted by adjusting a focal length and a light emitting direction of the liquid crystal lens.

8. The method according to claim 3, wherein the holographic display device further comprises a positioning device, and the positioning device detects at least two observation positions, and the first light directing unit comprises a first lens and a pinhole filter, and the second light directing unit comprises a lens group and concave mirrors arranged on a non-light-transmission side of the lens group, the lens group comprising one second lens or at least two second lenses arranged side by side, and a sum of number of the concave mirrors and number of the second lenses is same to number of the pinholes, and wherein after detecting the observation positions by the positioning device, the method comprises:
 based on the observation positions, setting a plurality of optical paths in one-to-one coincidence with the observation positions respectively and outputting the control signals to the first lens, the second lenses and the concave mirrors depending on the optical paths, by the direction controller;
 adjusting a deflection angle of the output light passing through the first lens by the first lens in response to the control signals, and directing the output light into each of the pinholes in time sequence along different optical paths respectively and transporting the light passing through each of the pinholes to one second lens or one concave mirror along an optical path, by the first lens,
 receiving the control signals and converging the light incident on the second lens to the observation position matched with an optical path by the second lens,
 receiving the control signals and reflecting the light incident on the concave mirror to the observation position matched with another optical path by the concave mirror.

9. A holographic display device, comprising a light source, a spatial light modulator, an adjustable light directing device and a direction controller,
 wherein the spatial light modulator is arranged at a light exit side of the light source and configured to modulate a reading light supplied by the light source and to emit an output light;
 wherein the direction controller is connected to the adjustable light directing device and configured to set an optical path of the output light depending on an observation position and to output a control signal to the adjustable light directing device depending on the optical path, the optical path being matched with the observation position;
 wherein the adjustable light directing device is arranged on a light exit side of the spatial light modulator and configured to adjust a direction of the output light of the spatial light modulator in response to the control signal outputted by the direction controller to direct the output light to the observation position along the optical path,
 wherein the adjustable light directing device comprises a first light directing unit and a second light directing unit, and the control signal outputted by the direction controller comprises a first control signal and a second control signal, wherein the first light directing unit is configured to receive the first control signal from the direction controller and direct the output light to the second light directing unit along the optical path, and the second light directing unit is configured to receive the second control signal from the direction controller and direct an exit light of the first light directing unit to the observation position along the optical path,
 wherein the first light directing unit comprises a first lens and a pinhole filter arranged at a light exit side of the first lens, at least one pinhole being arranged in the pinhole filter; and wherein the first lens is connected to the direction controller and configured to direct the output light into one of the pinholes in the pinhole filter.

10. The holographic display device according to claim 9, wherein the first light directing unit further comprises a third lens which is arranged at a side of the pinhole filter close to the first lens and faces towards the position of the pinhole of the pinhole filter, the third lens being configured to converge the exit light of the first lens.

11. The holographic display device according to claim 9, wherein the first lens is a liquid crystal lens or a convex lens.

12. A holographic display device, comprising a light source, a spatial light modulator, an adjustable light directing device and a direction controller,
wherein the spatial light modulator is arranged at a light exit side of the light source and configured to modulate a reading light supplied by the light source and to emit an output light;
wherein the direction controller is connected to the adjustable light directing device and configured to set an optical path of the output light depending on an observation position and to output a control signal to the adjustable light directing device depending on the optical path, the optical path being matched with the observation position;
wherein the adjustable light directing device is arranged on a light exit side of the spatial light modulator and configured to adjust a direction of the output light of the spatial light modulator in response to the control signal outputted by the direction controller to direct the output light to the observation position along the optical path,
wherein the adjustable light directing device comprises a first light directing unit and a second light directing unit, and the control signal outputted by the direction controller comprises a first control signal and a second control signal, wherein the first light directing unit is configured to receive the first control signal from the direction controller and direct the output light to the second light directing unit along the optical path, and the second light directing unit is configured to receive the second control signal from the direction controller and direct an exit light of the first light directing unit to the observation position along the optical path,
wherein the second light directing unit comprises at least one concave mirror; and wherein each of the concave mirrors is connected to the direction controller and configured to reflect an exit light at one pinhole to the observation position.

13. The holographic display device according to claim 12, wherein the first light directing unit comprises a first lens and a pinhole filter arranged at a light exit side of the first lens, at least one pinhole being arranged in the pinhole filter; and wherein the second light directing unit further comprises a lens group at a light exit side of the pinhole filter, the lens group comprising one second lens or at least two second lenses arranged side by side; and wherein the concave mirrors are arranged on a non-light-transmission side of the lens group, and a sum of number of the concave mirrors and number of the second lenses is same to number of the at least one pinhole; and
wherein each of the second lenses is connected to the direction controller and configured to converge the exit light at one pinhole to one observation position.

14. The holographic display device according to claim 13, wherein the concave mirrors are spherical mirrors.

15. The holographic display device according to claim 14, wherein the spherical mirrors each have a central axis in coincidence with a center of the lens group.

16. The holographic display device according to claim 13, wherein the second lenses are convex lenses.

* * * * *